US012633660B2

(12) United States Patent
Han et al.

(10) Patent No.: US 12,633,660 B2
(45) Date of Patent: May 19, 2026

(54) LIQUID CRYSTAL ANTENNA BOX, ANTENNA, AND METHOD OF MANUFACTURING LIQUID CRYSTAL ANTENNA BOX

(71) Applicant: Chengdu Tianma Micro-Electronics Co., Ltd., Chengdu (CN)

(72) Inventors: Xiaonan Han, Chengdu (CN); Baiquan Lin, Chengdu (CN); Kerui Xi, Chengdu (CN); Zhen Liu, Chengdu (CN); Linzhi Wang, Chengdu (CN); YIfan Xing, Chengdu (CN); Xiaojun Chen, Chengdu (CN); Shengwei Dai, Chengdu (CN)

(73) Assignee: Chengdu Tianma Micro-Electronics Co., Ltd., Chengdu (CN)

(*) Notice: Subject to any disclaimer, the term of this patent is extended or adjusted under 35 U.S.C. 154(b) by 273 days.

(21) Appl. No.: 18/431,058

(22) Filed: Feb. 2, 2024

(65) Prior Publication Data

US 2025/0007159 A1 Jan. 2, 2025

(30) Foreign Application Priority Data

Jun. 30, 2023 (CN) ........................ 202310806219.X

(51) Int. Cl.
*H01Q 3/38* (2006.01)
*H01Q 1/38* (2006.01)

(52) U.S. Cl.
CPC ................. *H01Q 3/38* (2013.01); *H01Q 1/38* (2013.01)

(58) Field of Classification Search
CPC ............... H01Q 3/38; H01Q 1/38; H01Q 3/44
See application file for complete search history.

(56) References Cited

U.S. PATENT DOCUMENTS

| | | | | |
|---|---|---|---|---|
| 11,128,043 | B2 * | 9/2021 | Asagi | H10D 86/60 |
| 11,469,500 | B2 * | 10/2022 | Yang | G02F 1/13439 |
| 12,489,201 | B2 * | 12/2025 | Han | H01Q 1/12 |
| 2021/0215956 | A1 * | 7/2021 | Bi | G02F 1/1313 |

FOREIGN PATENT DOCUMENTS

| | | | |
|---|---|---|---|
| CN | 104765195 A | 7/2015 | |
| CN | 113659333 A * | 11/2021 | H01Q 1/52 |

* cited by examiner

*Primary Examiner* — Seung H Lee
(74) *Attorney, Agent, or Firm* — Anova Law Group, PLLC

(57) ABSTRACT

Liquid crystal antenna box, antenna, and method of manufacturing the antenna box are provided. The antenna box includes first baseplate, second baseplate, liquid crystal layer, and insulation layer. The first baseplate includes a first substrate and a first metal layer. The first metal layer includes a ground part and a via between the ground parts. The second baseplate includes a second substrate and a second metal layer. The second metal layer includes a phase shifter and an interval groove between the phase shifters. Surface spacing between the phase shifter, and the insulation layer in the via or a surface of the first substrate close to the second substrate, surface spacing between the ground part, and the insulation layer at the interval groove or a surface of the second substrate close to the first substrate, and surface spacing between the ground part and the phase shifter, are equal.

17 Claims, 9 Drawing Sheets

LIQUID CRYSTAL ANTENNA BOX, ANTENNA, AND METHOD OF MANUFACTURING LIQUID CRYSTAL ANTENNA BOX

CROSS-REFERENCE TO RELATED APPLICATION

This application claims priority of Chinese Patent Application No. 202310806219. X, filed on Jun. 30, 2023, the entire content of which is hereby incorporated by reference.

FIELD OF THE DISCLOSURE

The present disclosure generally relates to the field of antenna technology and, more particularly, relates to a liquid crystal antenna box, an antenna, and a method of manufacturing the liquid crystal antenna box.

BACKGROUND

In a liquid crystal antenna box, a thickness of the liquid crystal antenna box is usually supported and maintained by spraying support components, ball spacers (BS), to a liquid crystal layer in the liquid crystal antenna box. During a process of spraying the BS, the BS may be randomly distributed in the liquid crystal antenna box. The BS may be used to support an upper baseplate and a lower baseplate of the liquid crystal antenna box.

The upper baseplate and the lower baseplate of the liquid crystal antenna box may be disposed with metal traces. Existence of the metal traces may lead to unequal spacing between inner surfaces of the upper baseplate and the lower baseplate in the liquid crystal antenna box, resulting in different compression ratios of the BS. When the spacing is too small, the BS may be broken under pressure. When the spacing is too large, the BS may not be in contact with the upper baseplate and the lower baseplate, and may thus lose support capacity.

SUMMARY

One aspect of the present disclosure includes a liquid crystal antenna box. The liquid crystal antenna box includes a first baseplate. The first baseplate includes a first substrate and a first metal layer. The first metal layer is disposed on a side of the first substrate in a thickness direction of the first substrate, the first metal layer includes a ground part, and a via is arranged between the ground parts. The liquid crystal antenna box also includes a second baseplate, disposed opposite to the first baseplate in the thickness direction. The second baseplate includes a second substrate and a second metal layer. The second metal layer is disposed on a side of the second substrate facing the first metal layer. The second metal layer includes a phase shifter, an interval groove is arranged between the phase shifters, and the phase shifter is aligned with the via in the thickness direction. The liquid crystal antenna box also includes a liquid crystal layer disposed between the first baseplate and the second baseplate, and an insulation layer disposed over at least one of a surface of the first substrate close to the second substrate and a surface of the second substrate close to the first substrate. Spacing between a surface of the phase shifter, and a surface of the insulation layer disposed in the via or the surface of the first substrate close to the second substrate is H1. Spacing between a surface of the ground part, and a surface of the insulation layer disposed at the interval groove or the surface of the second substrate close to the first substrate is H2. Spacing between the surface of the ground part and the surface of the phase shifter is H3, with H1=H3 and H2=H3.

Another aspect of the present disclosure includes an antenna. The antenna includes a liquid crystal antenna box. The liquid crystal antenna box includes a first baseplate. The first baseplate includes a first substrate and a first metal layer. The first metal layer is disposed on a side of the first substrate in a thickness direction of the first substrate, the first metal layer includes a ground part, and a via is arranged between the ground parts. The liquid crystal antenna box also includes a second baseplate, disposed opposite to the first baseplate in the thickness direction. The second baseplate includes a second substrate and a second metal layer. The second metal layer is disposed on a side of the second substrate facing the first metal layer. The second metal layer includes a phase shifter, an interval groove is arranged between the phase shifters, and the phase shifter is aligned with the via in the thickness direction. The liquid crystal antenna box also includes a liquid crystal layer disposed between the first baseplate and the second baseplate, and an insulation layer disposed over at least one of a surface of the first substrate close to the second substrate and a surface of the second substrate close to the first substrate. Spacing between a surface of the phase shifter, and a surface of the insulation layer disposed in the via or the surface of the first substrate close to the second substrate is H1. Spacing between a surface of the ground part, and a surface of the insulation layer disposed at the interval groove or the surface of the second substrate close to the first substrate is H2. Spacing between the surface of the ground part and the surface of the phase shifter is H3, with H1=H3 and H2=H3.

Another aspect of the present disclosure includes a method of manufacturing the liquid crystal antenna box. The method includes providing a first substrate and a second substrate, forming a first metal layer on the first substrate, and forming a second metal layer on the second substrate. The method also includes coating a positive photoresist on the first metal layer and the second metal layer respectively, using a mask to etch the first metal layer and the second metal layer to pattern the first metal layer and the second metal layer, and forming an insulation layer on at least one of the first metal layer and the second metal layer. The method also includes coating a negative photoresist on the insulation layer, using the mask to etch the insulation layer to pattern the insulation layer, to form the first baseplate and the second baseplate, and disposing a liquid crystal layer between the first baseplate and the second baseplate to form the liquid crystal antenna box.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

Figure 1:
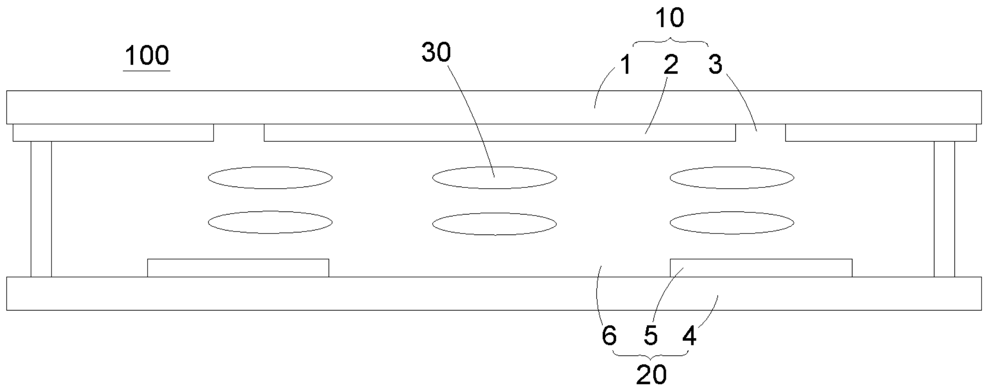
FIG. 1 illustrates a structural schematic diagram of a liquid crystal antenna box in existing technology.

Labels and letters used in FIGS. 1-20 are as follows:

100—liquid crystal antenna box; 10—first baseplate; 1—first substrate; 2—ground part; 3—via; 20—second baseplate; 4—second substrate; 5—phase shifter; 6—interval groove; 7—gap; 8—accommodation groove; 30—liquid crystal layer; 40—insulation layer; 41—first portion; 42—second portion; 43—third portion; 44—fourth portion; 45—fifth portion; 45*a*—body portion; 45*b*—protrusion portion; 50—support part; 51—support column; 51*a*—first support column; 51*b*—second support column; 60—alignment layer.

FIGS. 1-20 are not drawn to scale.

DETAILED DESCRIPTION

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the specification.

In the present disclosure, orientation words refer to directions shown in the accompanying drawings, and are not intended to limit the liquid crystal antenna box, antenna, and method of manufacturing the liquid crystal antenna box in the present disclosure. Unless otherwise clearly specified and limited, terms "installation" and "connection" should be understood in a broad sense. For example, "connection" may refer to a fixed connection, a detachable connection, or an integral connection. In addition, "connection" may refer to a direct connection or an indirect connection. Those of ordinary skill in relevant fields may understand specific meanings of the above terms according to specific situations in the present disclosure.

Reference will now be made in detail to embodiments of the present disclosure, which are illustrated in the accompanying drawings. Similar labels and letters designate similar items in the drawings. Once an item is defined in one drawing, the item may not be defined and discussed in subsequent drawings.

Figure 2:
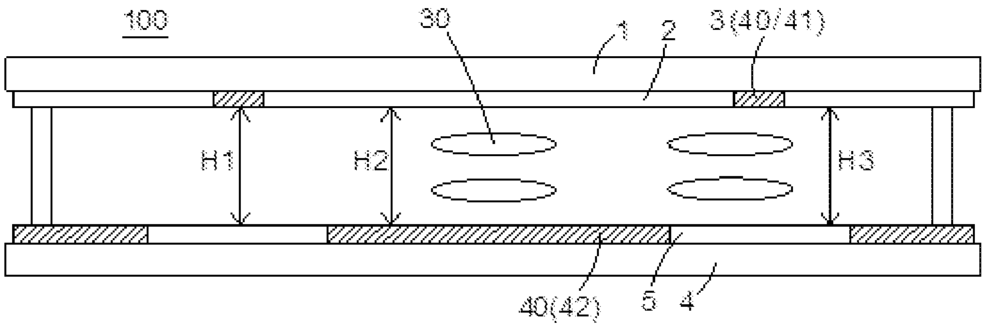
FIG. 2 illustrates a schematic structural diagram of a liquid crystal antenna box consistent with the disclosed embodiments of the present disclosure.

FIG. 1 illustrates a structural schematic diagram of a liquid crystal antenna box in existing technology. FIG. 2 illustrates a schematic structural diagram of a liquid crystal antenna box consistent with the disclosed embodiments of the present disclosure. Referring to FIG. 2, the present disclosure provides a liquid crystal antenna box 100, including a first baseplate 10, a second baseplate 20, and a liquid crystal layer 30. The first baseplate 10 includes a first substrate 1 and a first metal layer. The first metal layer is disposed on a side of the first substrate 1 in a thickness direction of the first substrate 1. The first metal layer includes a ground part 2, and a via 3 arranged between the ground parts 2. The second baseplate 20 is disposed opposite to the first baseplate 10 in the thickness direction. The second baseplate 20 includes a second substrate 4 and a second metal layer. The second metal layer is disposed on a side of the second substrate 4 facing the first metal layer. The second metal layer includes a phase shifter 5, and an interval groove 6 arranged between the phase shifters 5. The phase shifter 5 is aligned with the via 3 in the thickness direction. The liquid crystal layer 30 is disposed between the first baseplate 10 and the second baseplate 20. Along a length direction of the liquid crystal antenna box 100, in the thickness direction, a sum of the spacing between the first substrate 1 and a surface of the first baseplate 10 facing the second baseplate 20 and the spacing between the second substrate 2 and a surface of the second baseplate 20 facing the first baseplate 10 is consistently equal.

The liquid crystal antenna box 100 is formed by splicing the first baseplate 10 and the second baseplate 20 up and down, and then pouring the liquid crystal layer 30 between the first baseplate 10 and the second baseplate 20. Optionally, a support part 50 may be disposed in the liquid crystal layer 30 to support the first baseplate 10 and the second baseplate 20. The liquid crystal layer 30 may also be capable of processing transmitted signals.

The first metal layer is disposed on the first substrate 1. The first baseplate 10 may use the ground part 2 in the first metal layer to achieve grounding, and may use the vias 3 between the ground parts 2 to communicate with outside. For the second baseplate 20, the second metal layer is disposed on the second substrate 4. The second metal layer includes a plurality of phase shifters 5 arranged at intervals. An interval groove 6 may be formed between phase shifters 5. The phase shifter 5 is set in one-to-one correspondence with the via 3, such that signals processed by the phase shifter 5 may be transmitted out through the via 3. The liquid crystal antenna box 100 may operate as a radiating structure, and the signals may be eventually received by an external receiver.

Referring to FIG. 1, in existing technologies, since the first substrate 1 includes the ground part 2 and the via 3, and the second substrate 4 includes the phase shifter 5 and the interval groove 6, inner surfaces of the first baseplate 10 and the second baseplate 20 may be uneven. Accordingly, the spacing between the inner surfaces of the first baseplate 10 and the second baseplate 20 may not be consistently equal.

When the support parts 50 are disposed in the liquid crystal layer 30, a part of the support parts 50 may abut between the inner surfaces of the first baseplate 10 and the second baseplate 20. Another part of the support parts 50 may be squeezed and deformed at a narrower position between the first baseplate 10 and the second baseplate 20, and may thus be damaged. Another part of the support parts 50 may be located between the first substrate 10 and the second substrate 20 at a position with a wider thickness. Since the compression may be too large, the support parts may be crushed, or may fail due to exceeding the elastic shrinkage range, and thus may not play a supporting role.

To address the above problems, in the present disclosure, the spacing between the inner surfaces of the first baseplate 10 and the second baseplate 20 is set to be consistently equal as much as possible. As such, the support parts 50 between the first baseplate 10 and the second baseplate 20 may have a uniform size, and each of the support parts 50 may just abut against the first baseplate 10 and the second baseplate 20 simultaneously, playing a supporting role.

The present disclosure provides a liquid crystal antenna box 100. The spacing between the inner surfaces of the first baseplate 10 and the second baseplate 20 of the liquid crystal antenna box 100 may be set to be consistently equal as much as possible, and thus the thickness of the space between the first baseplate 10 and the second baseplate 20 may be uniform. Accordingly, the size of the support part 50 in the liquid crystal layer 30 between the first baseplate 10 and the second baseplate 20 may be set to be same. The support parts 50 may abut against the first baseplate 10 and the second baseplate 20 simultaneously, playing a supporting role for each of the first baseplate 10 and the second baseplate 20. As a result, problems such as failure or damage of the support parts 50 caused by uneven thickness of the space between the first baseplate 10 and the second baseplate 20 may be avoided. As such, the support parts 50 may play a good supporting role, and the support parts 50 may be protected in operation. The overall structural stability of the liquid crystal antenna box 100 may be improved, and reliable performance of the liquid crystal antenna box 100 may be achieved.

As an optional embodiment, referring to FIG. 2, the liquid crystal antenna box 100 includes an insulation layer 40. The insulation layer 40 is disposed on at least one of the first metal layer and the second metal layer. The spacing between the surface of the insulation layer 40 disposed in the via 3 and the surface of the phase shifter 5 is H1. The spacing between the surface of the insulation layer 40 disposed at the interval groove 6 and the surface of the ground part 2 is H2. The spacing distance between the surface of the ground part 2 and the surface of the phase shifter 5 is H3, with H1=H3 and H2=H3.

In one embodiment, the insulation layer 40 is disposed in the liquid crystal antenna box 100. The insulation layer 40 may be used to fill the first metal layer and the second metal layer. As such, the flatness of the first metal layer and the second metal layer may be improved, and the inner surfaces of the first baseplate 10 and the second baseplate 20 may become flat.

The phase shifter 5 is arranged corresponding to the via 3, and part of the phase shifter 5 also corresponds to part of the ground part 2. When the insulation layer 40 is filled in the via 3, the spacing between the insulation layer 40 and the phase shifter 5 is H1, and the spacing between the ground part 2 and the phase shifter 5 corresponding to the ground part 2 is H3, with H1=H3. In addition, the insulation layer 40 is filled in the interval groove 6, and the spacing between the insulation layer 40 and the ground part 2 is H2, with H2=H3. As such, by taking H3 as a reference, the spacing between the inner surfaces of the first baseplate 10 and the second baseplate 20 is consistently H3 as much as possible.

Optionally, the insulation layer 40 may be disposed on each of the first metal layer and the second metal layer. The insulation layer 40 may also be disposed only on the first metal layer or the second metal layer. The first baseplate 10 and the second baseplate 20 may have flat surfaces or concave-convex surfaces, provided that the spacing between the inner surfaces of the first baseplate 10 and the second baseplate 20 is consistently equal as much as possible.

The present disclosure provides a liquid crystal antenna box 100. The insulation layer 40 is disposed in the liquid crystal antenna box 100, filling the first metal layer and the second metal layer. The spacing between the inner surfaces of the first baseplate 10 and the second baseplate 20 may be consistently equal, and good uniformity of inside thickness of the liquid crystal antenna box may be achieved.

Figure 3:
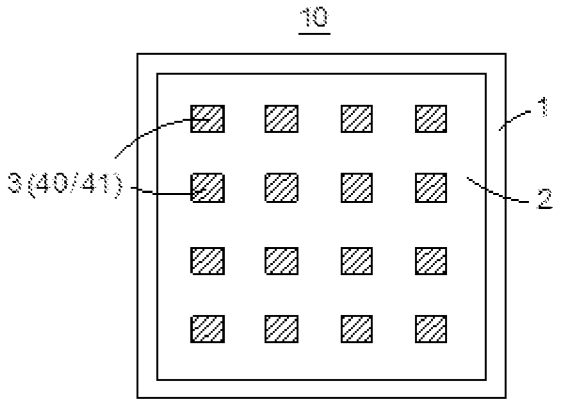
FIG. 3 illustrates a schematic plan view of a first baseplate consistent with the disclosed embodiments of the present disclosure.
Figure 4:
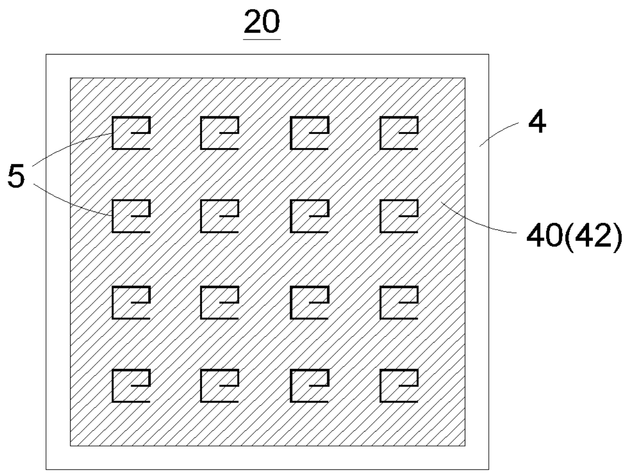
FIG. 4 illustrates a schematic plan view of a second baseplate consistent with the disclosed embodiments of the present disclosure.

FIG. 3 illustrates a schematic plan view of a first baseplate consistent with the disclosed embodiments of the present disclosure. FIG. 4 illustrates a schematic plan view of a second baseplate consistent with the disclosed embodiments of the present disclosure. In one embodiment, referring to FIGS. 2-4, the insulation layer 40 includes a first portion 41 and a second portion 42. The first portion 41 is disposed in the via 3 and is flush with the ground part 2. The second portion 42 is disposed in the interval groove 6 and is flush with the phase shifter 5.

The insulation layer 40 is disposed on each of the first metal layer and the second metal layer. The first portion 41 of the insulation layer 40 is disposed in the via 3 of the first metal layer. The second portion 42 of the insulation layer 40 is disposed in the interval groove 6 of the second metal layer. The first portion 41 and the adjacent ground part 2 have a same thickness and are flush. The second portion 42 and the phase shifter 5 have a same thickness and are flush. As a result, after the first portion 41 and the second portion 42 are filled, each of the inner surfaces of the first metal layer and the second metal layer is flat.

The present disclosure provides a liquid crystal antenna box 100. The first portion 41 and the second portion 42 fill the via 3 and the interval groove 6 respectively. As a result, the first metal layer and the second metal layer may each have a flat inner surface. Accordingly, the spacing between the first baseplate 10 and the second baseplate 20 may be consistently equal, and the inner surfaces of the first baseplate 10 and the second baseplate 20 may have good flatness.

Figure 5:
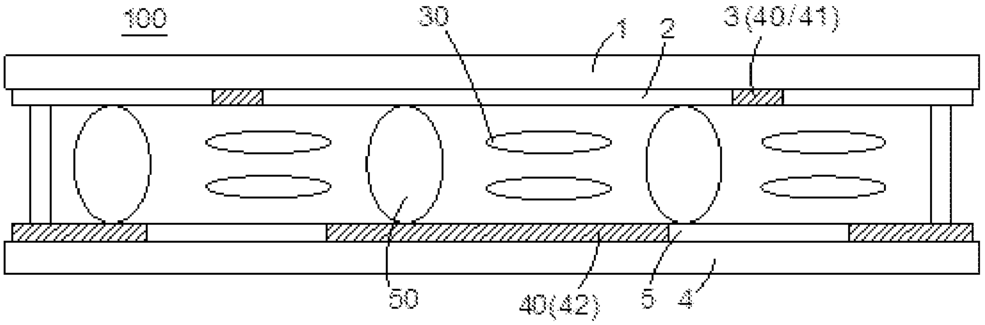
FIG. 5 illustrates a schematic structural diagram of another liquid crystal antenna box consistent with the disclosed embodiments of the present disclosure.

FIG. 5 illustrates a schematic structural diagram of another liquid crystal antenna box consistent with the disclosed embodiments of the present disclosure. As an optional embodiment, referring to FIG. 5, the liquid crystal antenna box 100 includes a support part 50. The support part 50 is disposed in the liquid crystal layer 30. One end of the support part 50 in the thickness direction abuts against the first baseplate 10 and the other end abuts against the second baseplate 20.

After the first portion 41 and the second portion 42 are respectively filled in the first metal layer and the second metal layer, the first metal layer and the second metal layer each form a flat surface. The liquid crystal layer 30 is located between the first metal layer and the second metal layer. The support part 50 abuts against the first baseplate 10 and the second baseplate 20 in the liquid crystal layer 30.

The spacing between the first baseplate 10 and the second baseplate 20 is consistently equal as much as possible. The liquid crystal antenna box may include a plurality of support parts, and the plurality of support parts 50 may have a same dimension in the thickness direction. In addition, two ends of each support part 50 in the thickness direction abut against the first baseplate 10 and the second baseplate 20 respectively. Accordingly, the support part 50 may provide good support for the first baseplate 10 and the second baseplate 20.

The present disclosure provides a liquid crystal antenna box 100. The support part 50 is disposed in the liquid crystal layer 30 between the first baseplate 10 and the second baseplate 20. The support part 50 abuts against the first baseplate 10 and the second baseplate 20, playing a supporting role. In addition, since the support part 50 is located between flat surfaces, the support part 50 may have good structural stability.

Figure 6:
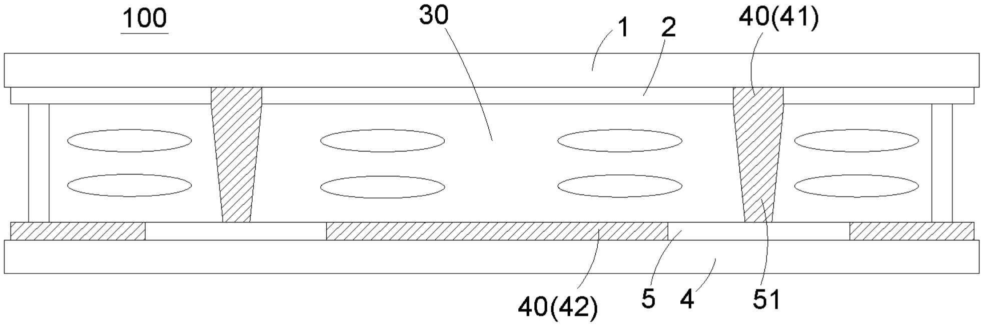
FIG. 6 illustrates a schematic structural diagram of another liquid crystal antenna box consistent with the disclosed embodiments of the present disclosure.

FIG. 6 illustrates a schematic structural diagram of another liquid crystal antenna box consistent with the disclosed embodiments of the present disclosure. In one embodiment, referring to FIG. 6, the support part 50 includes a support column 51. One end of the support column 51 in the thickness direction is connected to the first portion 41 and the other end extends toward the phase shifter 5. In another embodiment, the support part 50 may have a spherical structure.

Optionally, for a specific structure of the support part 50, the support part 50 may be set as a spherical structure. The support part 50 may have a same size in the thickness direction, and may abut against the first baseplate 10 and the second baseplate 20. The support part 50 may move in the liquid crystal layer 30. Since the spacing between the first baseplate 10 and the second baseplate 20 is consistently equal, when the support part 50 moves in the liquid crystal layer 30, the support part 50 may not be crushed.

Optionally, the support part 50 may have a columnar structure. The support column 51 may connect to the first portion 41. The support column 51 may extend from the first portion 41 and abut against the corresponding phase shifter 5. The support column 51 may be integrally formed with the first portion 41. The support column 51 and the first portion 41 may be made of a same material.

The support column 51 may support the first baseplate 10 and the second baseplate 20, providing an overall support for the liquid crystal antenna box 100. In this case, the spacing between the first baseplate 10 and the second baseplate 20 is not crucial. The support part 50 may not be damaged by squeeze between the first baseplate 10 and the second baseplate 20. The second portion 42 of the insulation layer 40 may not be disposed in the interval groove 6 of the second metal layer, and the flatness of the second metal layer may not be required.

The present disclosure provides a liquid crystal antenna box 100. The support part 50 may be set as a support column 51. The support column 51 may provide support to the first baseplate 10 and the second baseplate 20. The support column 51 may not fail or be damaged between the first baseplate 10 and the second baseplate with uneven thicknesses. Accordingly, the liquid crystal antenna box 100 may have good stability.

Figure 7:
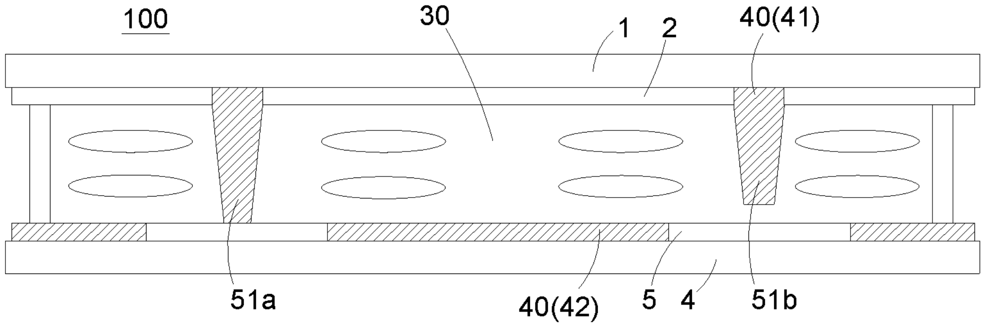
FIG. 7 illustrates a schematic structural diagram of another liquid crystal antenna box consistent with the disclosed embodiments of the present disclosure.

FIG. 7 illustrates a schematic structural diagram of another liquid crystal antenna box consistent with the disclosed embodiments of the present disclosure. As an optional embodiment, referring to FIG. 7, the support column 51 may include a first support column 51*a* and a second support column 51*b*. One end of the first support column 51*a* in the thickness direction is connected to one first portion 41 and the other end abuts against the phase shifter 5. One end of the second support column 51*b* in the thickness direction is connected to another first portion 41. A height of the first support column 51*a* is greater than a height of the second support column 51*b*.

The support columns 51 may be specifically classified into the first support column 51*a* and the second support column 51*b*. The first support column 51*a* is higher than the second support column 51*b*. The first support column 51*a* abuts against the phase shifter 5, and plays a supporting role for the first baseplate 10 and the second baseplate 20. The first support column 51*a* may be regarded as a primary support column.

Since the second support column 51*b* is shorter than the first support column 51*a*, the second support column 51*b* may only extend toward the phase shifter 5 and could not form abutment with the phase shifter 5. The second support column 51*b* and the phase shifter 5 are separated by an interval. Only when the liquid crystal antenna box 100 is pressed, the second support column 51*b* may form abutment with the phase shifter 5 and play a supporting role for the first baseplate 10 and the second baseplate 20. Accordingly, the second support column 51*b* may be understood as an auxiliary support column.

Optionally, under normal circumstances, the interval between the second support column 51*b* and the phase shifter 5 is in a range of approximately 0.5-0.65 μm. When the liquid crystal antenna box 100 is pressed, the interval between the second support column 51*b* and the phase shifter 5 may disappear. The present disclosure does not specifically limit the size of the interval between the second support column 51*b* and the phase shifter 5.

Optionally, considering the primary and auxiliary support functions of the first support column 51*a* and the second support column 51*b*, the occupation areas of first support column 51*a* and the second support column 51*b* on the first baseplate 10 may be different. The orthographic projection area of the first support column 51*a* in the thickness direction accounts for approximately 0.2% of the area of the first baseplate 10. The orthographic projection area of the second support column 51*b* in the thickness direction accounts for approximately 1.3% of the area of the first baseplate 10.

In some other embodiments, the ratio of the areas of the orthographic projection of the first support column 51*a* and the second support column 51*b* in the thickness direction to the area of the first baseplate 10 may be other values to meet the requirements of different specifications.

The present disclosure provides a liquid crystal antenna box 100. The support columns 51 may be specifically classified into a first support column 51*a* and a second support column 51*b*. The first support column 51*a* and the second support column 51*b* may provide supporting functions for the liquid crystal antenna box 100 in a normal state and a pressed state respectively. Accordingly, the liquid crystal antenna box 100 may have good supporting performance in the normal state and the pressed state, and good stability of the overall structure may be achieved.

Figure 8:
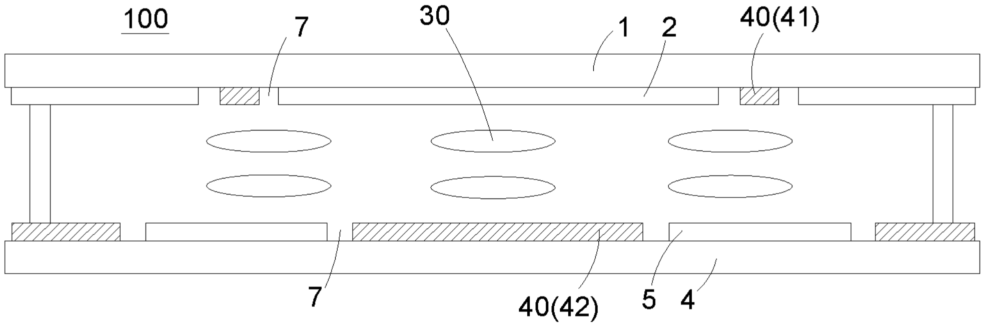
FIG. 8 illustrates a schematic structural diagram of another liquid crystal antenna box consistent with the disclosed embodiments of the present disclosure.

FIG. 8 illustrates a schematic structural diagram of another liquid crystal antenna box consistent with the disclosed embodiments of the present disclosure. As an optional embodiment, referring to FIG. 8, there is a gap 7 between the ground part 2 and the surface of the first portion 41 close to the second baseplate 20, and/or, there is a gap 7 between the phase shifter 5 and the surface of the second portion 42 close to the first baseplate 10.

Optionally, there is a gap 7 between the first portion 41 as a whole and the ground part 2, and there is a gap 7 between the second portion 42 as a whole and the phase shifter 5. The gap 7 has a size in a range of approximately 1-2 μm.

The reason for setting the gap 7 between the insulation layer 40 and the respective metal layer includes that in the process of disposing the insulation layer 40, a deviation of the insulation layer 40 may appear. With the gap 7, when the deviation appears, the insulation layer 40 and the metal layer may not overlap, and a certain deviation space may exist.

The present disclosure provides a liquid crystal antenna box 100. A gap 7 exists between the insulation layer 40 and the metal layer. The existence of the gap 7 complies with the process of forming the insulation layer 40. The possible deviation during the process of forming the insulation layer 40 may be allowed, and the difficulty of forming the insulation layer 40 may thus be decreased.

Figure 9:
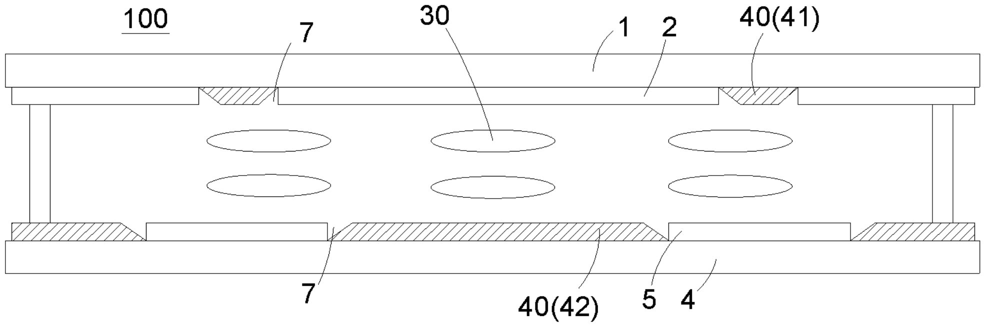
FIG. 9 illustrates a schematic structural diagram of another liquid crystal antenna box consistent with the disclosed embodiments of the present disclosure.

FIG. 9 illustrates a schematic structural diagram of another liquid crystal antenna box consistent with the disclosed embodiments of the present disclosure. As an optional embodiment, referring to FIG. 9, the edge of the first portion 41 close to the ground part 2 may be slope-shaped. The surface of the first portion 41 away from the second baseplate 20 may be connected to the ground part 2. The edge of the second portion 42 close to the phase shifter 5 is slope-shaped. The surface of the second portion 42 away from the first baseplate 10 may be connected to the phase shifter 5.

The present disclosure provides a liquid crystal antenna box 100. Specifically considering the process of forming the first portion 41 and the second portion 42, after the first portion 41 is formed, the surface close to the ground part 2 is a slop, and after the second portion 42 is formed, the surface close to the phase shifter 5 is a slope. A part of the insulation layer 40 may be adhered to the metal layer, complying with the actual process of forming the first portion 41 and the second portion 42.

Figure 10:
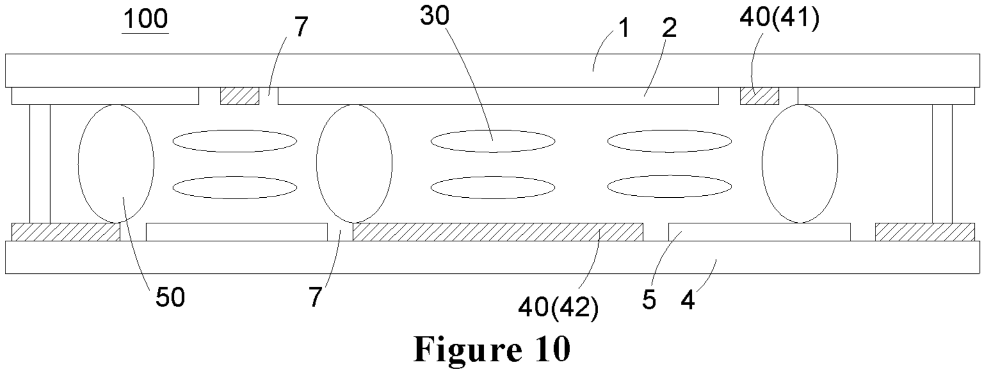
FIG. 10 illustrates a schematic structural diagram of another liquid crystal antenna box consistent with the disclosed embodiments of the present disclosure.
Figure 11:
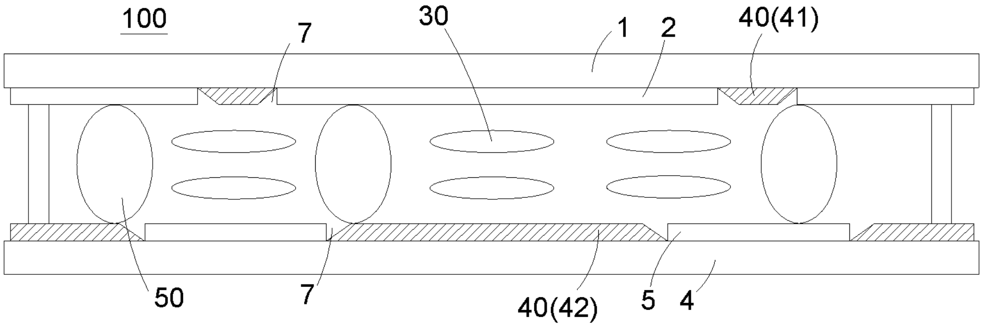
FIG. 11 illustrates a schematic structural diagram of another liquid crystal antenna box consistent with the disclosed embodiments of the present disclosure.

FIG. 10 illustrates a schematic structural diagram of another liquid crystal antenna box consistent with the disclosed embodiments of the present disclosure. FIG. 11 illustrates a schematic structural diagram of another liquid crystal antenna box consistent with the disclosed embodiments of the present disclosure. As an optional embodiment, referring to FIGS. 10 and 11, the support part 50 is larger than the gap 7. Since the gap 7 is located between the insulation layer 40 and the metal layer, to prevent the support part 50 in the liquid crystal layer 30 from falling into the gap 7 resulting in loss of support function, the support part 50 is set to be larger than the gap 7. Accordingly, the support part 50 may be kept in the liquid crystal layer 30 and may not fall into the gap 7.

Optionally, when the support part 50 has a spherical structure, the support part 50 may have a diameter of more than approximately 3 μm, and the gap 7 may have a size of approximately 1-2 μm. In this way, the support part 50 may not fall into the gap 7, and thus the support part 50 may keep abutting between the first baseplate 10 and the second baseplate 20.

The present disclosure does not specifically limit the size of the support part 50, provided that the support part is larger than the gap 7 and may not fall into the gap 7.

The present disclosure provides a liquid crystal antenna box 100. The size of the support part 50 is greater than the size of the gap 7. As such, the process of forming the insulation layer 40 and the metal layer may be satisfied, and the support part 50 may not fall into the gap between the insulation layer 40 and the metal layer. Accordingly, the support part 50 may keep providing support between the first baseplate 10 and the second baseplate 20, and the liquid crystal antenna box 100 may have good overall structural stability.

Figure 12:
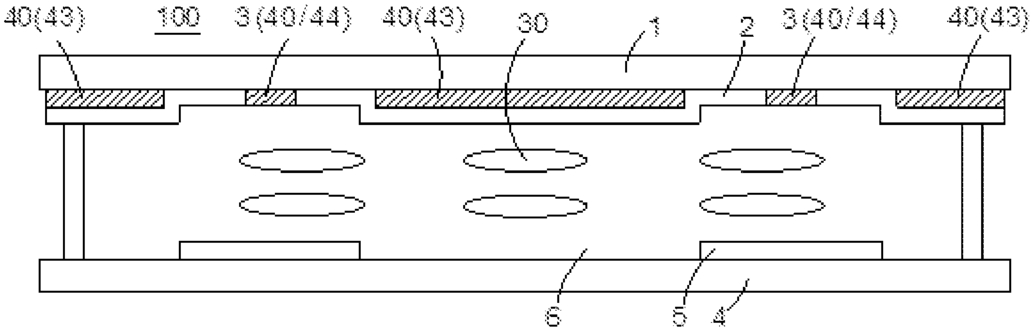
FIG. 12 illustrates a schematic structural diagram of another liquid crystal antenna box consistent with the disclosed embodiments of the present disclosure.

FIG. 12 illustrates a schematic structural diagram of another liquid crystal antenna box consistent with the disclosed embodiments of the present disclosure. As an optional embodiment, referring to FIG. 12, the insulation layer 40 includes a third portion 43. The third portion 43 is disposed on a side of the first substrate 1 close to the second substrate 4. An interval exists between two adjacent third portions 43. A part of the ground part 2 may be located on a side of the third portion 43 facing the second baseplate 20, and another part of the ground part 2 may be located in the interval between third portions 43. The via 3 is located on the ground part 2 at the interval between third portions 43. A fourth portion 44 may be disposed in the via 3, and the height of the fourth portion 44 is equal to the height of the adjacent ground part 2.

Optionally, in the thickness direction, the phase shifter 5 is disposed opposite to the interval. The spacing between the ground part 2 on the third portion 43 and the second substrate 4 is equal to the spacing between the phase shifter 5 and the ground part 2 in the gap 7.

In one embodiment, the insulation layer 40 is only disposed on the first metal layer. The structure of the first metal layer is adaptively adjusted such that the spacing between the inner surfaces of the first baseplate 10 and the second baseplate 20 is consistently equal.

In the second metal layer, the phase shifters 5 and the interval grooves 6 are arranged alternately. As such, the inner surface of the second baseplate 20 is uneven, and the structure of the first metal layer at the corresponding position may need to be adjusted.

It may be understood that, at the position corresponding to the interval groove 6, the third portion 43 of the insulation layer 40 may raise the ground part 2, thus reducing the spacing between the ground part 2 and the interval groove 6. In addition, at the position corresponding to the phase shifter 5, the ground part 2 is recessed corresponding the protruding structure of the phase shifter 5. Accordingly, the spacing between the ground part 2 and the interval groove 6 may be equal to the spacing between the recess of the ground part 2 and the phase shifter 5.

For the phase shifter 5 to transmit signals to the outside, a via 3 is set on the recess part of the ground part 2, at the position corresponding to the phase shifter 5. To make the surface of the ground part 2 in the recess part even, the via 3 is filled with the fourth portion 44 of the insulation layer 40, and the fourth portion 44 has a same height as the adjacent ground part 2. Accordingly, the spacing between the phase shifter 5 and the fourth portion 44 in the via 3 is equal to the spacing between the phase shifter 5 and the ground part 2 in the recess part.

The present disclosure provides a liquid crystal antenna box 100. The third portion 43 and the fourth portion 44 of the insulation layer 40 are disposed only on the first metal layer. Based the raising and filling treatment on the ground part 2 by the third portion 43 and the fourth portion 44, without changing the uneven surface of the second metal layer, the spacing between the inner surface of the first baseplate 10 and the second baseplate 20 may be made to be consistently equal.

Figure 13:
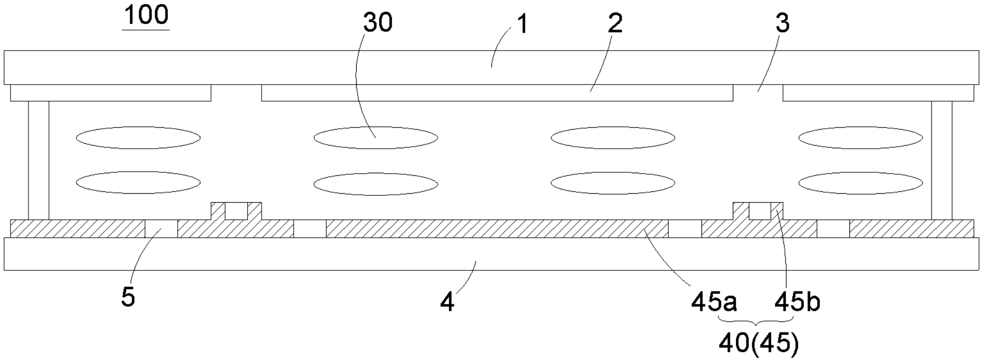
FIG. 13 illustrates a schematic structural diagram of another liquid crystal antenna box consistent with the disclosed embodiments of the present disclosure.
Figure 14:
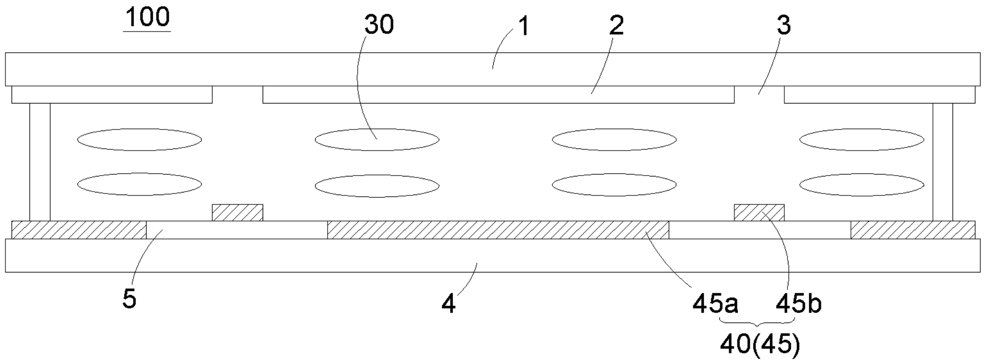
FIG. 14 illustrates a schematic structural diagram of another liquid crystal antenna box consistent with the disclosed embodiments of the present disclosure.

FIG. 13 illustrates a schematic structural diagram of another liquid crystal antenna box consistent with the disclosed embodiments of the present disclosure. FIG. 14 illustrates a schematic structural diagram of another liquid crystal antenna box consistent with the disclosed embodiments of the present disclosure. As an optional embodiment, referring to FIG. 13 and FIG. 14, the insulation layer 40 includes a fifth portion 45. The fifth portion 45 is disposed in the interval groove 6 and at least part of the phase shifter 5. The fifth portion 45 includes a body portion 45*a* arranged in the interval groove 6 and a protrusion portion 45*b* arranged corresponding to the phase shifter 5. The body portion 45*a* is flush with at least part of the phase shifter 5. The protrusion portion 45*b* protrudes toward the liquid crystal layer 30 and is aligned with the via 3. The spacing between the via 3 and the protrusion portion 45*b* is equal to the spacing between the ground part 2 and the body portion 45*a*.

In one embodiment, the insulation layer 40 is disposed only on the second metal layer as the fifth portion 45. The via 3 is on the first metal layer, and the ground parts 2 are arranged with the vias 3 as intervals. As such, the surface of the first metal layer may be uneven.

The fifth portion 45 includes a body portion 45*a* and a protrusion portion 45*b*. The body portion 45*a* is filled in the interval groove 6 and arranged corresponding to the ground part 2. The protrusion portion 45*b* is disposed on the phase shifter 5, and corresponds to the via 3. Accordingly, the spacing between the ground part 2 and the body portion 45*a* is equal to the spacing between the via 3 and the protrusion portion 45*b*. As such, the spacing between the inner surfaces of the first baseplate 10 and the second baseplate 20 may be made to be consistently equal without adjusting the first metal layer.

The present disclosure provides a liquid crystal antenna box 100. The fifth portion 45 of the insulation layer 40 is disposed only on the second metal layer. The body portion 45*a* and the protrusion portion 45*b* of the fifth portion 45 correspond to the protrusion and recession parts of the first metal layer respectively. In this way, the spacing between the first baseplate 10 and the second baseplate 20 may be made to be consistently equal without changing the structure of the first metal layer.

As an optional embodiment, referring to FIG. 13, the phase shifter 5 has a double-layer structure. One layer of the phase shifter 5 is disposed flush with the body portion 45*a*, and the other layer of the phase shifter 5 is disposed flush with the protrusion portion 45*b*.

Optionally, the phase shifter 5 may have a coil structure, and may be set as a double-layer structure. Specifically, the fifth portion 45 of the insulation layer 40 is first deposited on the second substrate 4, and the fifth portion 45 is then formed into a body portion 45*a* and a protrusion portion 45*b* through a photolithography process. The body portion 45*a* and the protrusion portion 45*b* each have a groove corresponding to the structure of the phase shifter 5 for accommodating the double-layer phase shifter 5. A metal layer is then deposited on the fifth portion 45 and patterned to obtain the structure of the phase shifter 5. Accordingly, the phase shifter 5 may coil in the grooves of the body portion 45*a* and the protrusion portion 45*b*, and a double-layer structure may thus be obtained.

In this way, the phase shifter 5 is partially raised, such that the spacing between the ground part 2 and the body portion 45*a* is equal to the spacing between the protrusion portion 45*b* and the via 3. Accordingly, the spacing between the first baseplate 10 and the second baseplate 20 may be consistently equal.

The present disclosure provides a liquid crystal antenna box 100. The phase shifter 5 has a double-layer structure coiling in the grooves of the body portion 45*a* and the protrusion portion 45*b*. In this way, the spacing between the first baseplate 10 and the second baseplate 20 may be made to be consistently equal. In addition, since the phase shifter 5 in the protrusion portion 45*b* is closer to the via 3, the signal transmission of the phase shifter 5 may be more convenient, and signal effects may be improved.

As an optional embodiment, referring to FIG. 14, the phase shifter 5 is a single-layer structure. The phase shifter 5 is disposed flush with the main body portion 45*a*. The protrusion portion 45*b* is located on a side of the phase shifter 5 close to the first baseplate 10.

In one embodiment, the phase shifter 5 may be set as a single-layer structure. The body portion 45*a* of the fifth portion 45 is flush with the phase shifter 5. The body portion 45*a* and the phase shifter have a flat surface. In addition, the protrusion portion 45*b* of the fifth portion 45 is formed on the phase shifter 5, corresponding to the via 3. The protrusion 45*b* partially covers the phase shifter 5. In this way, the spacing between the protrusion portion 45*b* and the via 3 may be equal to the spacing between the body portion 45*a* and the ground part 2. Accordingly, the spacing between the first baseplate 10 and the second baseplate 20 may be consistently equal.

The present disclosure provides a liquid crystal antenna box 100. The phase shifter 5 has a single-layer structure. The surface of the second metal layer may be adjusted by the body portion 45*a* and the protrusion portion 45*b*. The spacing between the first baseplate 10 and the second baseplate 20 may be consistently equal, and the difficulty of the process for forming the body portion 45*a* and the protrusion portion 45*b* of the fifth portion 45 may be decreased.

Optionally, the first metal layer and the second metal layer may be metal copper layers. The insulation layer 40 may be a non-metal film layer, and may be made of a material including SiNx, SiOx, or a combination thereof.

Figure 15:
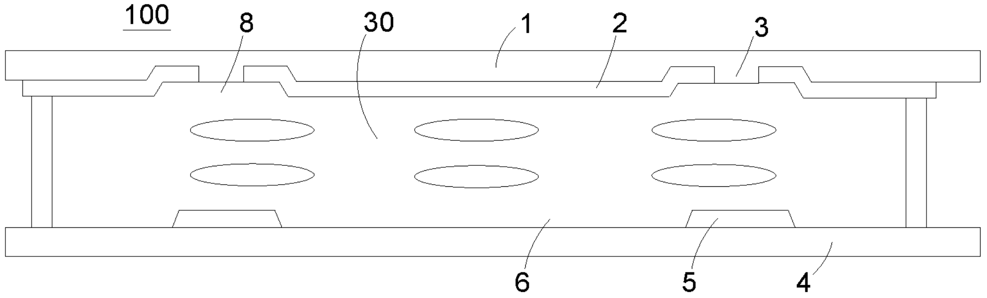
FIG. 15 illustrates a schematic structural diagram of another liquid crystal antenna box consistent with the disclosed embodiments of the present disclosure.

FIG. 15 illustrates a schematic structural diagram of another liquid crystal antenna box consistent with the disclosed embodiments of the present disclosure. As an optional embodiment, referring to FIG. 15, the side of the first substrate 1 close to the liquid crystal layer 30 has an accommodation groove 8 arranged in alignment with the phase shifter 5. The accommodation groove 8 is recessed away from the liquid crystal layer 30. The spacing between the accommodation groove 8 and the phase shifter 5 is equal to the spacing between the ground part 2 and the interval groove 6.

In one embodiment, the liquid crystal antenna box 100 may not include the insulation layer 40. The structure of the first substrate 1 may be modified. The protrusion at the place where the phase shifter 5 is disposed in the second metal layer may cause the spacing between the first baseplate 10 and the second baseplate to be unequal. As such, the accommodation groove 8 is set at the position of the first substrate 1 corresponding to the phase shifter 5. The accommodation groove 8 is recessed away from the liquid crystal layer 30, corresponding to the protrusion at the phase shifter 5.

Optionally, the accommodation groove 8 on the first substrate 1 may be formed by etching. After the accommodation groove 8 is formed by etching, the ground part 2 is attached along the inner surface of the first substrate 1. The ground part 2 is recessed in the accommodation groove 8. The spacing between the ground part 2 and the phase shifter 5 in the accommodation groove 8 is equal to the spacing between the interval groove 6 and the remaining part of the ground part 2. Accordingly, the spacing between the first baseplate 10 and the second baseplate 20 may be consistently equal.

The present disclosure provides a liquid crystal antenna box 100. An accommodation groove 8 is formed on a place of the first substrate 1 corresponding to the phase shifter 5. The concave height of the accommodation groove 8 is equal to the height of the protrusion of the phase shifter 5. In this way, the spacing between the first baseplate 10 and the second baseplate 20 may be made to be consistently equal without filling the insulation layer 40. Accordingly, the material for the insulation layer 40 may be saved, the process flow may be reduced, and the manufacturing difficulty may be decreased.

Figure 16:
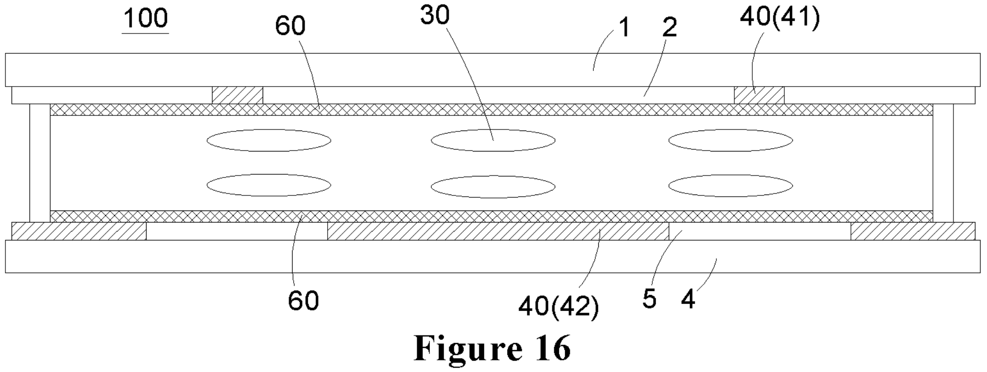
FIG. 16 illustrates a schematic structural diagram of another liquid crystal antenna box consistent with the disclosed embodiments of the present disclosure.

FIG. 16 illustrates a schematic structural diagram of another liquid crystal antenna box consistent with the disclosed embodiments of the present disclosure. As an optional embodiment, referring to FIG. 16, the liquid crystal antenna box 100 includes an alignment layer 60. The alignment layer 60 is respectively disposed on a side of the first baseplate 10 close to the liquid crystal layer 30 and a side of the second baseplate 20 close to the liquid crystal layer 30.

The present disclosure provides a liquid crystal antenna box 100. Since the alignment layer 60 is disposed on each side of the liquid crystal layer 30, the spacing between the first baseplate 10 and the second baseplate 20 may be consistently equal. In addition, the angle of the liquid crystal molecules in the liquid crystal layer 30 may be adjusted. Accordingly, the liquid crystal molecules may perform signal processing according to a predetermined angle.

The present disclosure provides an antenna, including the above-mentioned liquid crystal antenna box 100.

Figure 17:
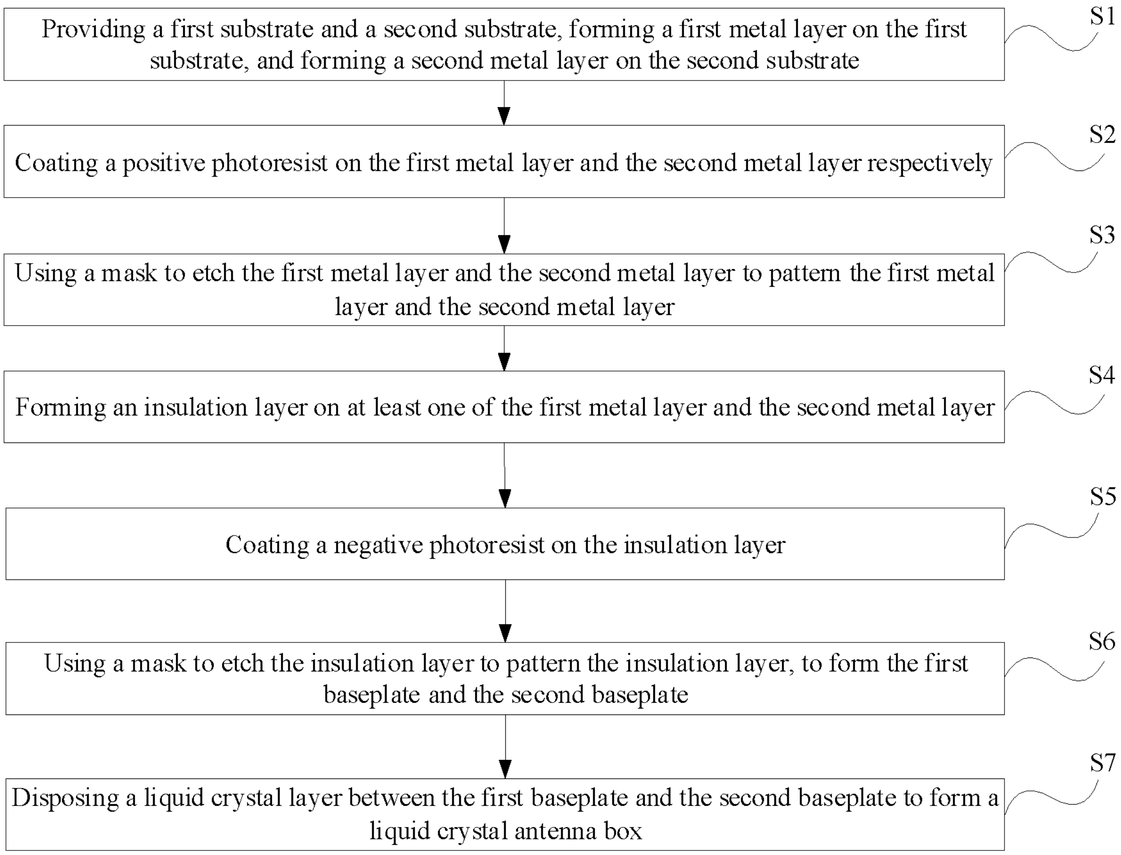
FIG. 17 illustrates a flow chart of a method of manufacturing a liquid crystal antenna box consistent with the disclosed embodiments of the present disclosure.

FIG. 17 illustrates a flow chart of a method of manufacturing a liquid crystal antenna box consistent with the disclosed embodiments of the present disclosure. Referring to FIG. 17, the present disclosure provides a method of manufacturing a liquid crystal antenna box 100, including:

S1: providing a first substrate 1 and a second substrate 4, forming a first metal layer on the first substrate 1, and forming a second metal layer on the second substrate 4;

S2: coating a positive photoresist on the first metal layer and the second metal layer respectively;

S3: using a mask to etch the first metal layer and the second metal layer to pattern the first metal layer and the second metal layer;

S4: forming an insulation layer 40 on at least one of the first metal layer and the second metal layer;

S5: coating a negative photoresist on the insulation layer 40;

S6: using a mask to etch the insulation layer 40 to pattern the insulation layer 40, to form the first baseplate 10 and the second baseplate 20; and S7: disposing a liquid crystal layer 30 between the first baseplate 10 and the second baseplate 20 to form a liquid crystal antenna box 100.

Optionally, during S1-S3, the first metal layer and the second metal layer may be formed on the first substrate 1 and the second substrate 4 by a physical vapor deposition (PVD) process respectively. After coating the positive photoresist on the metal layer, photolithography may be performed by using a mask, such that the first metal layer and the second metal layer may be patterned. The ground part 2 and the via 3 may be formed in the first metal layer, and the phase shifter 5 and the interval groove 6 may be formed in the second metal layer.

During S4-S5, the negative photoresist may be coated on the insulation layer 40 deposited on the metal layer. The insulation layer 40 may also be patterned by photolithography using a mask. Since the patterns of the metal layer and the insulation layer 40 may be complementary, the mask may be shared in the photolithography process. The insulation layer 40 may be formed on the metal layer by a chemical vapor deposition (CVD) process.

Figure 18:
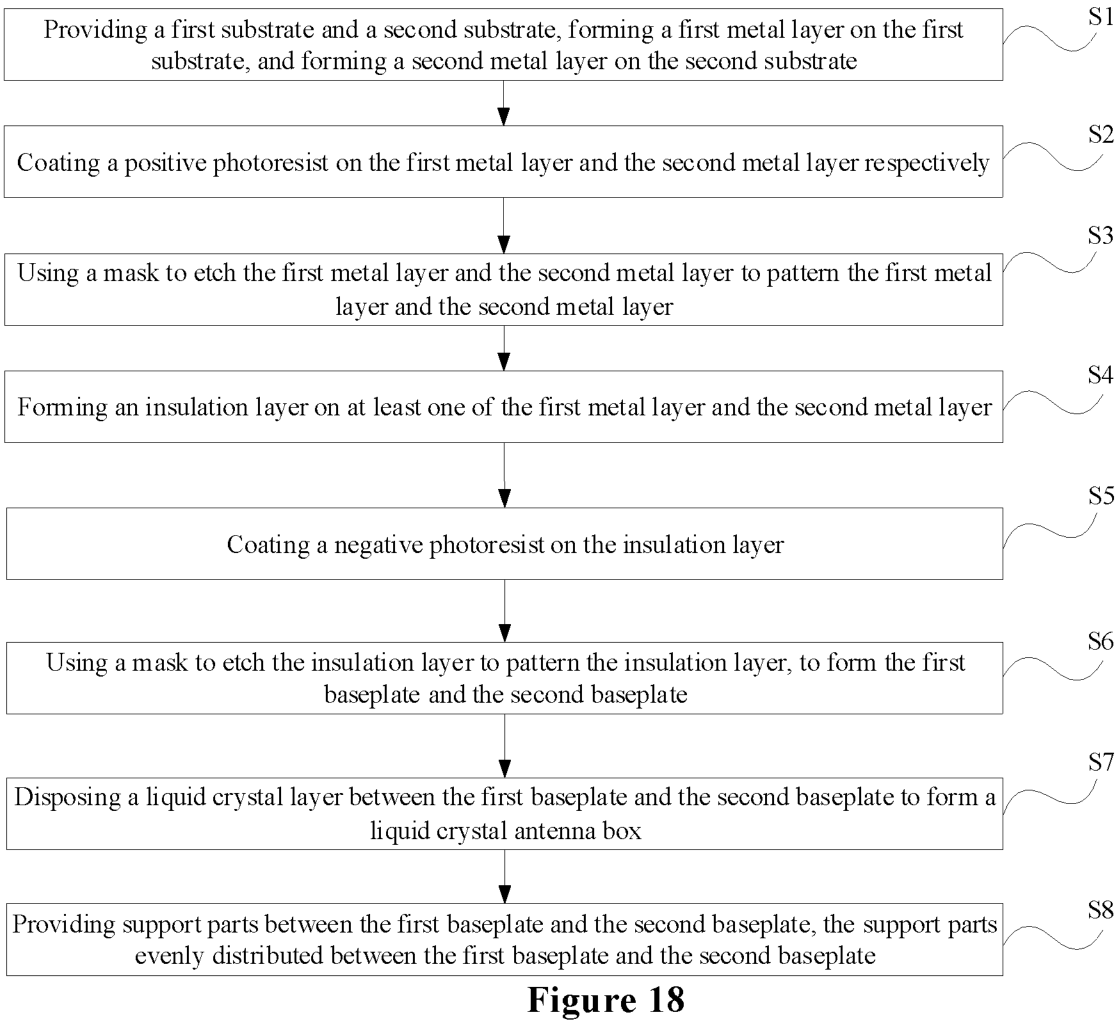
FIG. 18 illustrates a flow chart of another method of manufacturing a liquid crystal antenna box consistent with the disclosed embodiments of the present disclosure.

FIG. 18 illustrates a flow chart of another method of manufacturing a liquid crystal antenna box consistent with the disclosed embodiments of the present disclosure. As an optional embodiment, referring to FIG. 18, the method of manufacturing a liquid crystal antenna box 100 also includes:

S8: providing support parts 50 between the first baseplate 10 and the second baseplate 20, the support parts 50 evenly distributed between the first baseplate 10 and the second baseplate 20.

Optionally, since the support parts 50 may have fluidity in the liquid crystal layer 30, the support parts 50 may be evenly sprayed into the liquid crystal layer 30 to support the first baseplate 10 and the second baseplate 20.

Figure 19:
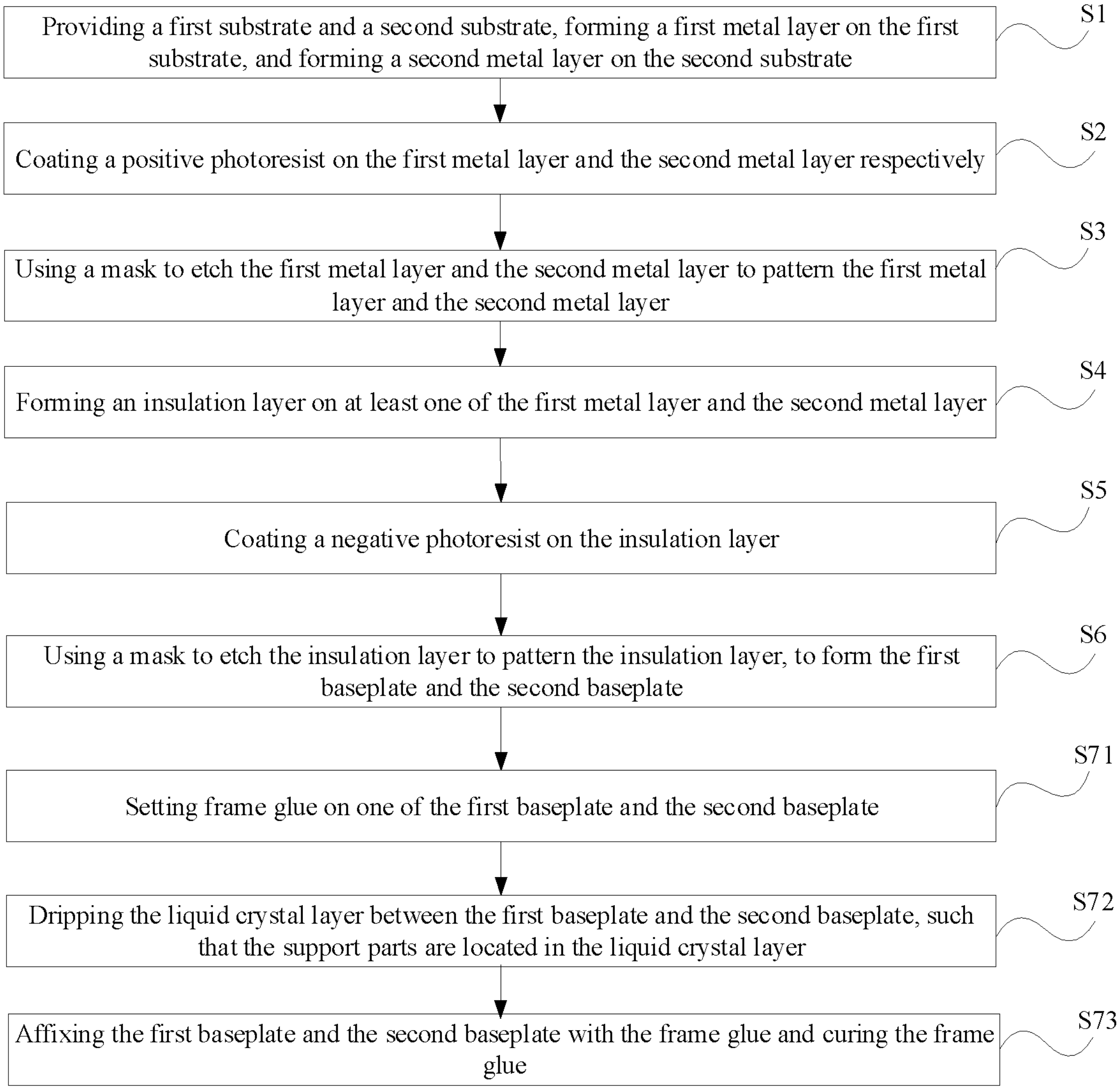
FIG. 19 illustrates a flow chart of another method of manufacturing a liquid crystal antenna box consistent with the disclosed embodiments of the present disclosure.

FIG. 19 illustrates a flow chart of another method of manufacturing a liquid crystal antenna box consistent with the disclosed embodiments of the present disclosure. As an optional embodiment, referring to FIG. 19, disposing a liquid crystal layer 30 between the first baseplate 10 and the second baseplate 20 includes:

S71: setting frame glue on one of the first baseplate 10 and the second baseplate 20;

S72: dripping the liquid crystal layer 30 between the first baseplate 10 and the second baseplate 20, such that the support parts 50 are located in the liquid crystal layer 30; and S73: affixing the first baseplate 10 and the second baseplate 20 with the frame glue and curing the frame glue.

In one embodiment, the liquid crystal layer 30 may be formed by liquid crystal dripping. That is, before the first baseplate 10 and the second baseplate 20 are affixed, the liquid crystal molecules may be dripped to the space between the first baseplate 10 and the second baseplate 20, and then the first baseplate 10 and the second baseplate 20 are affixed together.

Figure 20:
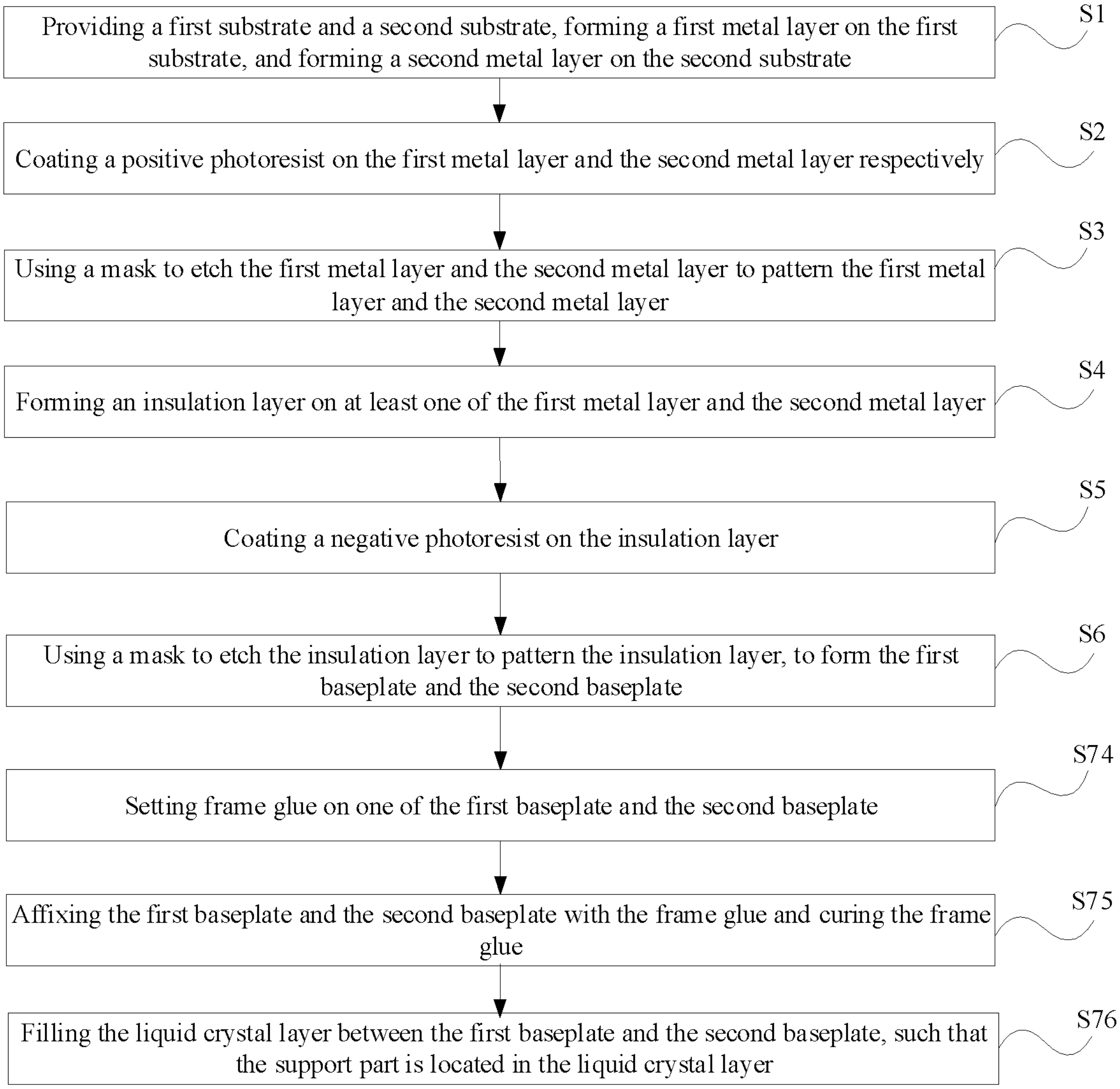
FIG. 20 illustrates a flow chart of another method of manufacturing a liquid crystal antenna box consistent with the disclosed embodiments of the present disclosure.

FIG. 20 illustrates a flow chart of another method of manufacturing a liquid crystal antenna box consistent with the disclosed embodiments of the present disclosure. As an optional embodiment, referring to FIG. 20, disposing a liquid crystal layer 30 between the first baseplate 10 and the second baseplate 20 includes:

S74: setting frame glue on one of the first baseplate 10 and the second baseplate 20;

S75: affixing the first baseplate 10 and the second baseplate 20 with the frame glue and curing the frame glue; and S76: filling the liquid crystal layer 30 between the first baseplate 10 and the second baseplate 20, such that the support part 50 is located in the liquid crystal layer 30.

In one embodiment, the first baseplate 10 and the second baseplate 20 are first affixed together with frame glue. After the overall box frame is formed, liquid crystal molecules are filled between the first baseplate 10 and the second baseplate 20, such that the liquid crystal layer 30 is formed between the first baseplate 10 and the second baseplate 20.

As disclosed, the technical solutions of the present disclosure have the following advantages.

The present disclosure provides a liquid crystal antenna box, an antenna, and a method of manufacturing a liquid crystal antenna box. The spacing between the inner surfaces of the first baseplate and the second baseplate of the liquid crystal antenna box is consistently equal, resulting in space uniformity between the first baseplate and the second baseplate. Accordingly, the sizes of the support parts in the liquid crystal layer between the first baseplate 10 and the second baseplate 20 may be set to be same, such that the support parts may abut against the first baseplate and the second baseplate simultaneously, playing a supporting role for the first baseplate and the second baseplate. As such, problems such as failure or damage of the support parts caused by an uneven internal thickness of a liquid crystal antenna box may be avoided. Accordingly, the support parts may play a good supporting role, and meanwhile the support parts may be protected. The overall structural stability of the liquid crystal antenna box may be improved, and reliable performance of the liquid crystal antenna box may be achieved.

The embodiments disclosed herein are exemplary only and not limiting the scope of the present disclosure. Various combinations, alternations, modifications, equivalents, or improvements to the technical solutions of the disclosed embodiments may be obvious to those skilled in the art. Without departing from the spirit and scope of this disclosure, such combinations, alternations, modifications, equivalents, or improvements to the disclosed embodiments are encompassed within the scope of the present disclosure.

What is claimed is:

1. A liquid crystal antenna box, comprising:

a first baseplate, including a first substrate and a first metal layer, wherein the first metal layer is disposed on a side of the first substrate in a thickness direction of the first substrate, the first metal layer includes a ground part, and a via is arranged between the ground parts;

a second baseplate, disposed opposite to the first baseplate in the thickness direction, wherein the second baseplate includes a second substrate and a second metal layer, the second metal layer is disposed on a side of the second substrate facing the first metal layer, the second metal layer includes a phase shifter, an interval groove is arranged between the phase shifters, and the phase shifter is aligned with the via in the thickness direction;

a liquid crystal layer, disposed between the first baseplate and the second baseplate; and an insulation layer, disposed over at least one of a surface of the first substrate close to the second substrate and a surface of the second substrate close to the first substrate, wherein:

spacing between a surface of the phase shifter, and a surface of the insulation layer disposed in the via or the surface of the first substrate close to the second substrate is H1;

spacing between a surface of the ground part, and a surface of the insulation layer disposed at the interval groove or the surface of the second substrate close to the first substrate is H2; and spacing between the surface of the ground part and the surface of the phase shifter is H3, wherein H1=H3 and H2=H3.

2. The liquid crystal antenna box according to claim 1, wherein:

the insulation layer includes a first portion and a second portion, wherein:

the first portion is disposed in the via and is flush with the ground part; and the second portion is disposed in the interval groove and is flush with the phase shifter.

3. The liquid crystal antenna box according to claim 1, further comprising a support part, wherein:

the support part is disposed in the liquid crystal layer; and in the thickness direction, one end of the support part abuts against the first baseplate, and another end of the support part abuts against the second baseplate.

4. The liquid crystal antenna box according to claim 3, wherein:

the support part includes a support column, wherein, in the thickness direction, one end of the support column is connected to the first portion, and another end of the support column extends toward the phase shifter; or the support part has a spherical structure.

5. The liquid crystal antenna box according to claim 4, wherein:

the support column includes a first support column and a second support column, wherein:

in the thickness direction, one end of the first support column is connected to one of the first portions and another end of the first support column abuts against the phase shifter;

in the thickness direction, one end of the second support column is connected to one of the first portions; and a height of the first support column is greater than a height of the second support column.

6. The liquid crystal antenna box according to claim 3, wherein:

in a length direction, a gap exists between the first portion and the ground part; and/or a gap exists between the second portion and the phase shifter.

7. The liquid crystal antenna box according to claim 6, wherein:

an edge of the first portion close to the ground part is slope-shaped, and a surface of the first portion away from the second baseplate is connected to the ground part; and/or an edge of the second portion close to the phase shifter is slope-shaped, and a surface of the second portion away from the first baseplate is connected to the phase shifter.

8. The liquid crystal antenna box according to claim 6, wherein:

a size of the support part is greater than a size of the gap.

9. The liquid crystal antenna box according to claim 1, wherein:

the insulation layer includes a third portion and a fourth portion, wherein:

the third portion is disposed on a side of the first substrate close to the second substrate, and an interval exists between the third portions;

a part of the ground part is located on a side of the third portion facing the second baseplate, and another part of the ground part is located in the interval between the third portions;

the via is located on the ground part at the interval between the third portions; and the fourth portion is disposed in the via, and a height of the fourth portion is equal to a height of the adjacent ground part.

10. The liquid crystal antenna box according to claim 9, wherein:

in the thickness direction, the phase shifter is arranged opposite to the interval between the third portions; and spacing between the ground part on the third portion and the second substrate is equal to spacing between the phase shifter and the ground part in the gap.

11. The liquid crystal antenna box according to claim 1, wherein:

the insulation layer includes a fifth portion, wherein the fifth portion is disposed in the interval groove and at least part of the phase shifter;

the fifth portion includes a body portion arranged in the interval groove and a protrusion portion arranged corresponding to the phase shifter;

the body portion is flush with at least part of the phase shifter;

the protrusion portion protrudes toward the liquid crystal layer and is aligned with the via; and spacing between the via and the protrusion portion is equal to spacing between the ground part and the body portion.

12. The liquid crystal antenna box according to claim 11, wherein:

the phase shifter has a double-layer structure, wherein one layer of the phase shifter is disposed flush with the body portion, and another layer of the phase shifter is disposed flush with the protrusion portion.

13. The liquid crystal antenna box according to claim 11, wherein:

the phase shifter has a single-layer structure, wherein the phase shifter is disposed flush with the main body portion, and the protrusion portion is located on a side of the phase shifter close to the first baseplate.

14. The liquid crystal antenna box according to claim 1, wherein:

the first metal layer and the second metal layer are metal copper layers, and the insulation layer is a non-metal film layer.

15. The liquid crystal antenna box according to claim 1, wherein:

a side of the first substrate close to the liquid crystal layer includes an accommodation groove in alignment with the phase shifter, wherein:

the accommodation groove is recessed away from the liquid crystal layer; and spacing between the accommodation groove and the phase shifter is equal to spacing between the ground part and the interval groove.

16. The liquid crystal antenna box according to claim 1, further comprising an alignment layer, wherein:

the alignment layer is respectively disposed on a side of the first baseplate close to the liquid crystal layer and a side of the second baseplate close to the liquid crystal layer.

17. An antenna, comprising a liquid crystal antenna box, wherein the liquid crystal antenna box comprises:

a first baseplate, including a first substrate and a first metal layer, wherein the first metal layer is disposed on a side of the first substrate in a thickness direction of the first substrate, the first metal layer includes a ground part, and a via is arranged between the ground parts;

a second baseplate, disposed opposite to the first baseplate in the thickness direction, wherein the second baseplate includes a second substrate and a second metal layer, the second metal layer is disposed on a side of the second substrate facing the first metal layer, the second metal layer includes a phase shifter, an interval groove is arranged between the phase shifters, and the phase shifter is aligned with the via in the thickness direction;

a liquid crystal layer, disposed between the first baseplate and the second baseplate; and an insulation layer, disposed over at least one of a surface of the first substrate close to the second substrate and a surface of the second substrate close to the first substrate, wherein:

spacing between a surface of the phase shifter, and a surface of the insulation layer disposed in the via or the surface of the first substrate close to the second substrate is H1;

spacing between a surface of the ground part, and a surface of the insulation layer disposed at the interval groove or the surface of the second substrate close to the first substrate is H2; and spacing between the surface of the ground part and the surface of the phase shifter is H3, wherein H1=H3 and H2=H3.

* * * * *